No. 880,679. PATENTED MAR. 3, 1908.
R. MASON.
CLOSURE FOR MUCILAGE AND OTHER RECEPTACLES.
APPLICATION FILED JAN. 21, 1907.
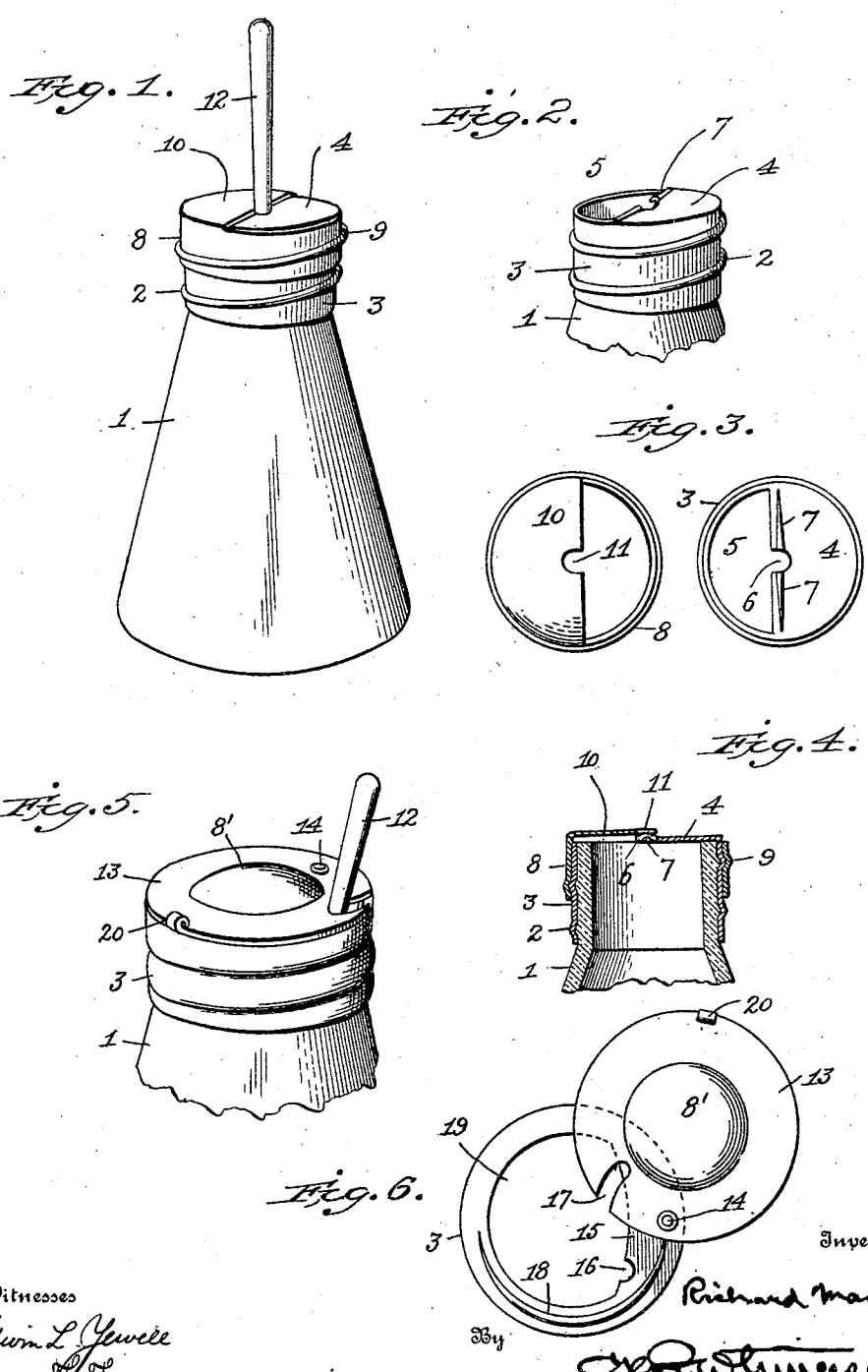
Witnesses
Edwin L. Yewell
Edwin J. Frey
Inventor
Richard Mason
By
Attorney
THE NORRIS PETERS CO., WASHINGTON, D. C.

UNITED STATES PATENT OFFICE.

RICHARD MASON, OF GLADSTONE, MICHIGAN.

CLOSURE FOR MUCILAGE AND OTHER RECEPTACLES.

No. 880,679.　　　　Specification of Letters Patent.　　　Patented March 3, 1908.

Application filed January 21, 1907. Serial No. 353,350.

*To all whom it may concern:*

Be it known that I, RICHARD MASON, a citizen of the United States, residing at Gladstone, in the county of Delta and State of Michigan, have invented new and useful Improvements in Closures for Mucilage and other Receptacles, of which the following is a specification.

This invention relates to means for closing bottles, jars and other receptacles for holding glue, mucilage, paste and the like, and its object is to not only effect tight closure but to provide means for retaining the handle of the brush in a convenient position for use; locking it against removal when the receptacle is closed but releasing it by the act of opening the same.

To this end, the closure comprises a cover mounted on the bottle, jar or other receptacle in such a manner as to be rotatable on a suitable axis, and provided with a notch to engage the handle of the brush when closed. Secured to the receptacle is a stationary top in which is a similar notch coöperating with the one in the cover, so that when the brush handle is placed in said stationary notch, and the cover is rotated to close it, the two notches encircle the handle and prevent the brush from being removed. But the act of opening the cover disengages the notches from the handle and releases it. In addition to this feature, the top is preferably provided with one or more ribs or ridges upon which the cover rests when closed, so as to assist in forming a tight closure.

In the accompanying drawing, Figure 1 is a perspective view of a bottle or other receptacle equipped with my improved closure. Fig. 2 is a view of the upper part of the same with the cover removed. Fig. 3 is a top plan view of the cover and the top of the bottle or other receptacle. Fig. 4 is a vertical section of the upper portion of Fig. 1. Fig. 5 is a perspective view of a modification, and Fig. 6 is a top plan view of the same, showing the cover open.

The upper portion of the bottle, jar or other receptacle 1 has secured to it by screw threads 2 or otherwise, a fixed top of sheet metal, which has a base 3 engaging the neck of the receptacle and a portion 4 extending partially across the mouth of the receptacle.

In Figs. 1 to 4, the top portion 4 extends over somewhat more than one half of the mouth of the receptacle, and as the neck of the receptacle shown in these figures is cylindrical, the opening 5 that is left is semi-circular in plan as shown in Fig. 3. A notch 6 is cut in the edge of the top portion 4, located in the axis of the circular neck. Said notch is preferably semi-circular in shape and opens into the opening 5. A rib or ridge 7 is pressed in the sheet metal top, parallel with the edge of the opening 5 and extending diametrically across the top portion 4. It is higher at the points where it is cut by the notch 6, and tapers down to the surface of the top at its outer ends.

A cover 8 is provided, having a cylindrical body or flange provided with screw threads 9 to mesh with those on the neck of the receptacle, so that the cover can be screwed on. The upper part of the cover is shaped to correspond with that of the top, and is cut away on a line parallel with the diameter and also on a line concentric with its axis, thus forming an opening corresponding in shape with that in the fixed top. The solid portion 10 which is left overlaps the edge of the top portion 4, when the cover is closed, as shown in Figs. 1 and 4, and bears upon the ridge 7 as appears in Fig. 4, so that the joint is rendered dust tight.

In the edge of the cover, and at its axis of rotation is a notch 11 which registers with the notch 6 in the top 4 and forms therewith, when the cover is turned to its closed position, a circular hole adapted to receive and snugly fit the handle 12 of a brush. When the cover is given a half rotation, so as to cause the complemental openings in the top and cover to register with each other and afford access to the interior of the receptacle, the two notches will coincide, and the brush handle can be removed laterally therefrom. After using the brush, it is placed in the superposed notches, and the cover is given a half rotation to bring it to its closed position, which will carry the notch 11 around to the opposite side of the handle and securely lock the same from being removed from the receptacle. At the same time, the coöperating screw threads in the cover and the neck portion of the top cause the cover to bear down firmly on the ridge 7 and form a dust proof joint between the cover and the top.

In the modification shown in Figs. 5 and 6, the top is flat and the cover 8′ which is preferably domed, has a flange 13 which rests upon the top and is rotatably pivoted thereto at 14 by a stout rivet of large diameter. The receptacle is opened by swinging the cover off to one side, as shown in Fig. 6. In the edge of the portion 15 of the top is a notch 16, while in the edge of the flange 13 is a notch 17, adapted to coöperate with the notch 16 when the cover is closed, and form a hole large enough to receive the handle of the brush. It is evident that the latter is released when the cover is opened.

In the top portion 15 is a ridge 18 adjacent to the edge of the opening 19 and formed by pressing up the sheet metal of which the top is made. This ridge is highest at the middle, tapering down to the surface of the top at each end. When the cover is closed it bears upon this ridge and effects a close joint therewith. The cover is preferably provided with a small handle, such as an integral strip curled into a loop 20.

Having thus described my invention, what I claim is:

1. The combination with a receptacle, of a fixed top having an opening, an upwardly projecting ridge extending along one edge of said opening, and a cover rotatably mounted on said top and having a smooth surface adapted to slide over and rest upon said ridge, and provided with a notch to receive the handle of a brush or the like.

2. The combination with a receptacle, of a fixed top having an opening, an upwardly projecting ridge extending along one edge of said opening, and a cover rotatably mounted on said top and bearing along the length of said ridge when closed, said cover being provided with an opening complemental with that in the top, and both openings comprising notches which coöperate to form an opening for the handle of a brush or the like when the receptacle is closed.

3. The combination with a receptacle, of a fixed top having an opening, in one side of which is a notch, and a cover rotatably mounted on said top concentric with said notch, and also having a corresponding notch in one side.

4. The combination with a receptacle, of a fixed top having an opening, one side of which is a diameter of said top and is provided at the center of said top with a notch, and a superposed cover having a complementary opening and notch, said cover being rotatable concentric with said notches.

5. The combination with a receptacle, of a fixed top having an opening, in one side of which is a notch, and a cover rotatably mounted on said top concentric with said notch, and having an opening comprising a notch registering with the notch in said top.

6. The combination with a receptacle, of a fixed top having a screw-threaded base and an opening in its top, a cover provided with a screw-threaded flange coöperating with the base and having a complemental opening, a ridge in said fixed top adjacent to the opening therein, and semi-circular notches in the top and cover located in the axis of rotation of said cover.

RICH. MASON.

Witnesses:
HAZEL G. MASON,
R. E. BEACH.